(12) United States Patent
Schromm et al.

(10) Patent No.: US 9,409,326 B2
(45) Date of Patent: Aug. 9, 2016

(54) DOUBLE BELT PRESS FOR PRODUCING A PLATE-LIKE PRODUCT

(75) Inventors: Hans-Kurt Schromm, Backnang (DE); Bernhard Voith, Ottenbach (DE); Matthias Kleinhans, Waiblingen (DE)

(73) Assignees: SANDVIK MATERIALS TECHNOLOGY DEUTSCHLAND GMBH, Duesseldorf (DE); TPS TECHNOPARTNER SAMTRONIC GMBH, Goeppingen-Ursenwang (DE)

( * ) Notice: Subject to any disclaimer, the term of this patent is extended or adjusted under 35 U.S.C. 154(b) by 625 days.

(21) Appl. No.: 13/813,552

(22) PCT Filed: Jul. 29, 2011

(86) PCT No.: PCT/EP2011/063066
§ 371 (c)(1),
(2), (4) Date: Feb. 26, 2013

(87) PCT Pub. No.: WO2012/016916
PCT Pub. Date: Feb. 9, 2012

(65) Prior Publication Data
US 2013/0147090 A1 Jun. 13, 2013

(30) Foreign Application Priority Data
Aug. 3, 2010 (DE) .......................... 10 2010 033 578

(51) Int. Cl.
*B29C 43/48* (2006.01)
*B27N 3/24* (2006.01)
(Continued)

(52) U.S. Cl.
CPC . *B29C 43/48* (2013.01); *B27N 3/24* (2013.01); *B29C 43/228* (2013.01); *B29C 70/506* (2013.01); *B30B 5/06* (2013.01); *B30B 15/34* (2013.01); *B29C 2043/483* (2013.01)

(58) Field of Classification Search
CPC ................................................ B29C 2043/483
See application file for complete search history.

(56) References Cited

U.S. PATENT DOCUMENTS 3,223,027 A   12/1965  Soda et al.
4,334,468 A   6/1982   Güttinger et al.
(Continued)

FOREIGN PATENT DOCUMENTS

CN   86 1 05159 A   2/1987
CN   1792591 A      6/2006
(Continued)

OTHER PUBLICATIONS

Machine Translation DE 2923036 A, Oct. 16, 2015.*
(Continued)

*Primary Examiner* — Benjamin Schiffman
(74) *Attorney, Agent, or Firm* — Flynn, Thiel, Boutell & Tanis, P.C.

(57) ABSTRACT

A double belt press having a first, lower circulating plastic belt and a second, upper circulating plastic belt. The plastic belts have a first, low flexural strength, and a product gap is formed between facing strands of the plastic belts for forming a plate-like product. A first circulating lower steel belt and a second circulating upper steel belt are provided and have a second flexural strength which is high in comparison to the flexural strength of the plastic belts. A forming section is formed between the facing strands of the steel belts, which forms part of the product gap. The first, lower steel belt runs parallel and bears against a rear face of the first plastic belt in the forming section during operation, and the second upper steel belt runs parallel and bears against a rear face of the second plastic belt in the forming section during operation.

22 Claims, 2 Drawing Sheets

(51) Int. Cl.
  *B29C 70/50* (2006.01)
  *B30B 5/06* (2006.01)
  *B30B 15/34* (2006.01)
  *B29C 43/22* (2006.01)

(56) References Cited

U.S. PATENT DOCUMENTS

| | | | |
|---|---|---|---|
| 4,396,566 A | | 8/1983 | Brinkmann et al. |
| 4,589,948 A | * | 5/1986 | Held .......................... B30B 5/06 100/154 |
| 4,826,560 A | | 5/1989 | Held |
| 4,844,766 A | | 7/1989 | Held |
| 5,098,514 A | | 3/1992 | Held |
| 6,007,320 A | | 12/1999 | Froese et al. |
| 6,217,700 B1 | | 4/2001 | Knobel |
| 7,241,407 B2 | | 7/2007 | Blomqvist et al. |
| 7,727,623 B2 | | 6/2010 | Blomqvist et al. |
| 2006/0024506 A1 | | 2/2006 | Blomqvist et al. |
| 2007/0141189 A1 | | 6/2007 | Blomqvist et al. |

FOREIGN PATENT DOCUMENTS

| | | | |
|---|---|---|---|
| DE | 1 504 816 | | 5/1969 |
| DE | 29 22 151 | | 12/1980 |
| DE | 2923036 | A * | 12/1980 |
| DE | 197 04 643 | A1 | 8/1998 |
| DE | 197 51 516 | | 5/1999 |
| DE | 198 54 708 | A1 | 5/2000 |
| DE | 101 23 865 | A1 | 11/2002 |
| DE | 101 23 866 | A1 | 1/2003 |
| DE | 103 39 679 | A1 | 3/2005 |
| EP | 0 046 526 | A2 | 3/1982 |
| EP | 1 045 751 | | 10/2000 |
| EP | 1 674 227 | A2 | 6/2006 |
| RU | 2008225 | C1 | 2/1994 |
| RU | 2309845 | C2 | 11/2007 |

OTHER PUBLICATIONS

International Search Report issued in International Application No. PCT/EP2011/063066 mailed Jan. 2, 2012 and English Translation Thereof (6 pages).

English translation of Chinese Second Office Action and Supplementary Search Report issued in Application No. 201180037942.1 of Chinese Patent Office dated Mar. 19, 2015 (13 pages).

Examination Report of German Patent Office issued in Application No. 10 2010 033 578.9-14 dated Apr. 13, 2011 (5 pages).

Office Action of Eurasian Patent Office issued in Application No. 201390174/31 with English translation dated May 23, 2014 (4 pages).

First Office Action of Chinese Patent Office issued in Application No. 201180037942.1 with English translation dated Jul. 3, 2014 (18 pages).

* cited by examiner

DOUBLE BELT PRESS FOR PRODUCING A PLATE-LIKE PRODUCT

FIELD OF THE INVENTION

The invention relates to a double belt press with a first, lower revolving plastic belt and with a second, upper revolving plastic belt, the plastic belts having a first, low flexural rigidity, and a product gap between the mutually confronting strands of the plastic belts being formed for the purpose of shaping a plate-like product. The invention also relates to a method for producing a plate-like product using a double belt press.

BACKGROUND OF THE INVENTION

European patent specification EP 1 045 751 B1 discloses a double belt press with a product gap between two plastic belts running partially in parallel. A thermoplastic preproduct is scattered onto a lower plastic belt in a feed region and is then shaped between the two plastic belts in the product gap into a plate-like product. Bonding of the thermoplastic preproduct into a stable plate-like product takes place by the virtually pressureless welding of the thermoplastic preproduct under a pressure of at most 0.2 bar. This known double belt press has disadvantages when it involves the production of thicker plate-like products and/or the processing of fibrous preproducts, for example during the processing of natural fibers.

SUMMARY OF THE INVENTION

By virtue of the invention, an improved double belt press and an improved method for producing a plate-like product using a double belt press are to be specified.

For this purpose, according to the invention, a double belt press with a first, lower revolving plastic belt and with a second, upper revolving plastic belt is provided, the plastic belts having a first, low flexural rigidity, and a product gap between the mutually confronting strands of the plastic belts being formed for the purpose of shaping a plate-like product, in which double belt press a first revolving lower steel belt and a second revolving upper steel belt are provided, the steel belts having a second flexural rigidity which is high in relation to the flexural rigidity of the plastic belts, a shaping portion being formed between the mutually confronting strands of the steel belts, the shaping portion forming part of the product gap, during operation the first, lower steel belt running in the shaping portion parallel to and so as to bear against a rear side, facing away from the product gap, of the first plastic belt, and during operation the second, upper steel belt running in the shaping portion parallel to and so as to bear against a rear side, facing away from the product gap, of the second plastic belt.

By provision of the steel belts which form a shaping portion and which in each case bear partially against a rear side of the plastic belts, the advantages of a double belt press having plastic belts and those of a double belt press having steel belts can be combined in a surprisingly simple way, without the respective disadvantages having to be taken into account. By means of the steel belts, a markedly higher pressure can be exerted in the shaping portion upon the product gap and upon the preproduct located in it than would be possible with plastic belts. In particular, the higher flexural rigidity of the steel belts makes it possible to maintain, even over a relatively long length of the shaping portion, a pressure profile which is highly equalized, as compared with plastic belts. The preproduct itself also stands in the shaping portion, but is always in contact solely with the plastic belts, so that there is no fear of the preproduct adhering to the steel belts. The double belt press according to the invention also affords advantages in energy terms. Thus, a constant temperature can be maintained in the shaping portion for the entire process duration. Since the heat storage capacity of the steel belts is higher than that of plastic belts, it is possible with low losses and also by means of heating devices which do not lie directly in the shaping region. However, the disadvantages occurring in the case of straightforward steel belt presses due to the necessary cooling of the steel belt in different portions of a product gap do not arise in the double belt press according to the invention, since the steel belts, of course, form part of the product gap in the shaping portion only. Cooling of the product in the product gap can then take place, for example, downstream of the shaping portion between the plastic belts. On account of the poor thermal conductivity of plastic, the heat losses of the double belt press according to the invention are therefore considerably lower than in the case of straightforward steel belt presses. By means of the double belt press according to the invention, even very thick plate-like products can consequently be produced easily, and even preproducts requiring a high pressure force in the product gap can be shaped into plate-like products. Nevertheless, the double belt press according to the invention can be implemented cost-effectively, as compared with straightforward steel belt presses, since, of course, the steel belts are required only in the shaping portion and, in terms of the process for producing the plate-like product, can be operated just as easily as conventional double belt presses having plastic belts. According to the invention, further, heating and/or cooling devices for heating or cooling the first and the second plastic belt are provided outside the shaping portion. For example, the plastic belt can be heated in a feed region and also in part of the product gap upstream of the shaping portion. Cooling of the plastic belts can then be carried out easily downstream of the shaping portion. The energy losses are in this case low, since, because of their low heat storage capacity, the plastic belts store little heat energy and transfer it further along the product gap. The plate-like product can consequently be preshaped even outside the shaping portion by means of the steel belts.

In a further development of the invention, heating and/or cooling devices for heating or cooling the first and the second steel belt are provided.

By heating or cooling the steel belt, the shaping portion as part of the product gap can easily be maintained at an approximately constant temperature. This is because the high heat storage capacity of the steel belts makes it possible to have a uniform temperature over the entire length of the shaping portion.

In a further development of the invention, pressure devices are provided in order to apply a pressure force in the shaping portion by means of the steel belts to a product arranged between the plastic belts.

Such pressure devices may be, for example, roller chains, pressure rollers, pressure plates or the like running on a rear side of the respective steel belt. Successfully proven pressure devices already known in the case of steel belt presses may be adopted here. If, for example, pressure rollers spaced apart from one another in the longitudinal direction are used, an equalized pressure force profile can be implemented, in spite of the essentially linear contact of the pressure rollers, because of the high flexural rigidity of the steel belts. The profile of the pressure force is in any event substantially more uniform than when a plastic belt is pressed down with low flexural rigidity by a plurality of pressure rollers lying one behind the other.

The pressure force advantageously lies in the range of 0.1 bar to 50 bar.

As a result of such a pressure range, products which are difficult to process or relatively thick plate-like products can be processed easily. Nevertheless, the costs of the double belt press are kept low, since there is no need for pressure forces lying above 50 bar, such as can readily be achieved by means of conventional steel belt double belt presses.

In a further development of the invention, the pressure devices are designed in order to apply in the shaping portion by means of the steel belts a pressure force which is uniform essentially over the entire shaping portion.

The provision of what is known as isobaric pressure force in the shaping portion can be implemented without difficulty because of the higher flexural rigidity of the steel belts and their mechanical load-bearing capacity which is generally higher than that of plastic belts. For example, the pressure devices are designed in order to act with pressurized fluid upon a rear side, facing away from the product gap, of the steel belts.

In a development of the invention, the plastic belts are provided, at least on their side facing the product gap, with a nonstick coating.

Such a nonstick coating may be composed, for example, of Teflon and is expediently coordinated with the type of plate-like product to be produced. By such a nonstick coating being provided, the plate-like product produced can easily be detached from the plastic belts at the end of the product gap, and, for example, the plate-like product can be extracted from the product gap even still in a very hot state. A nonstick coating may also be applied, for example, by a liquid being constantly sprayed on upstream of the product gap. A nonstick coating may also be in the form of what is known as a nanocoating which brings about a considerably reduced contact angle of a product to be processed on the plastic belts. Such a nanocoating may give rise, for example, to what is known as the lotus effect in which a contact angle between a product drop and the plastic belt assumes a very high value of about 160°. This corresponds to extremely low wettability. The aim is preferably to have contact angles of 90° or more than 90°. The contact angle between the margin of a product drop and a surface on which the product drop lies is also designated as the margin angle or wetting angle.

In a further development of the invention, at least in the shaping portion, side boundaries for laterally delimiting the product gap are provided.

The situation can thus be prevented where the preproduct to be processed flows laterally out between the plastic belts on account of a higher pressure possibly exerted in the shaping portion.

In a further development of the invention, a machine stand of the double belt press has a modular set-up and, as seen in the longitudinal direction of the product gap, is formed from a plurality of modules connected releasably to one another. Expediently, the two revolving steel belts and also deflections for the steel belts are arranged inside a modular portion of the machine stand.

By means of a modular set-up, double belt presses of different length and with a different set-up can be implemented at little extra outlay in structural terms and are then coordinated especially with a plate-like product to be produced. It becomes considerably easier also to convert the double belt press to another product to be produced. Arranging the two revolving steel belts inside a module and additionally, if appropriate, also heating devices and pressure rollers inside this modular portion makes it possible to retrofit a double belt press with revolving steel belts in order to form the double belt press according to the invention. The heating devices arranged in the module itself can be adapted especially to the requirements of the revolving steel belts.

In a further development of the invention, a length of the shaping portion amounts to less than half the length of the product gap, in particular to less than one tenth of the length of the product gap.

The double belt press according to the invention can thus be implemented cost-effectively. Steel belts are comparatively costly and also the pressure devices required contribute to high costs. Since a length of the shaping portion amounts to only a fraction of the length of the product gap, the extra costs incurred by the steel belts can be kept low. Nevertheless, the advantages of a higher pressure force in the shaping portion which can be applied by means of the steel belts can be utilized.

The problem on which the invention is based is also solved by a method for producing a plate-like product using a double belt press, comprising the following steps: application of at least one preproduct in a feed region to a first plastic belt, introduction of the at least one preproduct into a product gap between the first and the second plastic belt, thermal treatment and/or compression of the at least one preproduct in the product gap, introduction of the at least one preproduct into a shaping portion, the shaping portion forming part of the product gap, and thermal treatment and/or compression of the at least one preproduct in the shaping portion by means of two steel belts which bear in the shaping portion against a rear side, facing away from the product gap, of the plastic belts.

The thermal treatment and/or compression of the at least one preproduct in the shaping portion by means of two steel belts make/makes it possible to produce from preproducts even very thick plate-like products and also plate-like products which require a comparatively high pressure during production. These may be, for example, plate-like products which contain natural fibers or otherwise require a somewhat higher pressure for bonding individual particles of the preproducts into a homogeneous mass. Even when increased pressure is not to be applied in the shaping portion, the steel belts make it possible, as seen over the length of the shaping portion, to introduce a uniform heat flow into the preproduct in a simple way. On account of the high heat storage capacity of steel belts, a temperature distribution which is uniform over the shaping portion can thereby be achieved by simple means. In contrast to the use of double belt presses having steel belts which are continuous over the entire length, in this case the heat losses are reduced considerably, since the steel belts can remain at a constant temperature over the entire length of the shaping portion and do not have to be heated and then cooled again in different portions.

In a further development of the invention, application, in particular scattering, of at least one thermoplastic preproduct in the feed region is provided. Advantageously, the preproduct is heated in the feed region and/or in the product gap, in order to achieve welding of particles of the at least one thermoplastic preproduct to one another.

In a further development of the invention, the thermal treatment and/or compression of the at least one preproduct in the product gap are/is provided outside the shaping region.

In a further development of the invention, there is provision for laminating on of at least one layer in the product gap.

For example, decorative layers or else thin films or the like which protect the plate-like product against environmental influences can be laminated on. Laminating on can in this case be carried out easily by means of the method according to the invention and can make even tacky products difficult to process processible, since there no longer has to be direct contact between the product and the plastic belts.

Further features and advantages of the invention may be gathered from the claims and the following description of preferred embodiments of the invention in conjunction with the drawings.

BRIEF DESCRIPTION OF THE DRAWINGS

Individual features of the various embodiments illustrated in the figures can in this case be combined with one another in any way, without exceeding the scope of the invention. In the drawings.

DETAILED DESCRIPTION

Figure 1:
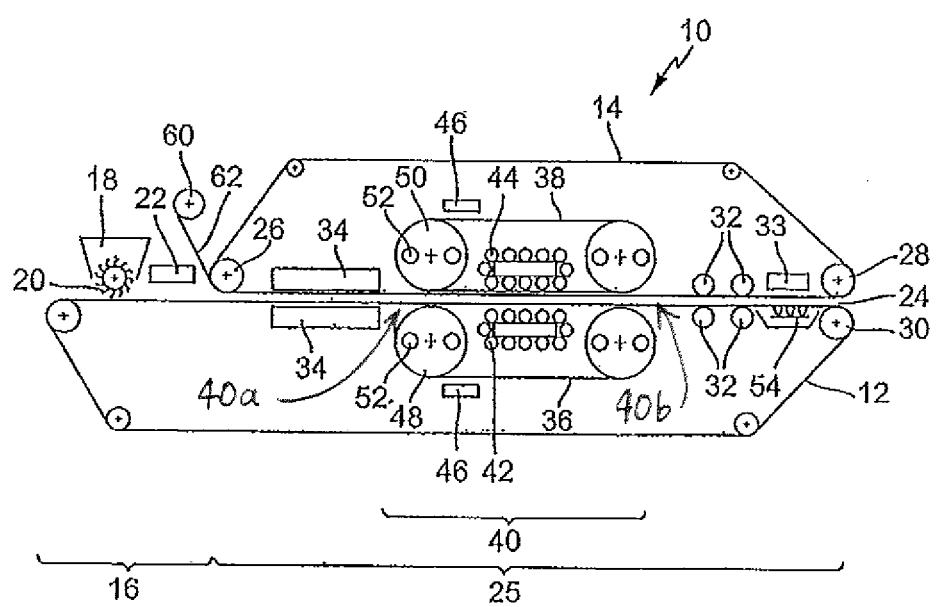
FIG. 1 shows a diagrammatic illustration of a double belt press according to the invention.

The diagrammatic illustration of a double belt press 10 according to the invention in FIG. 1 shows a first, lower revolving plastic belt 12 and a second, upper revolving plastic belt 14. An upper strand of the first plastic belt 12 defines, in a region 16, a feed region in which a preproduct, for example a thermoplastic preproduct, can be applied to the lower plastic belt 12. Above this feed region 16 is arranged a scattering device which serves, essentially from a funnel, for delivering the preproduct or a plurality of components in the form of a granulate or in the form of fibers. At the exit of the funnel, a scattering roller 20 is provided which extends over the entire width of the lower plastic belt 12. The scattering roller 20 is provided on its circumference with bristles, in order to ensure a uniform extraction of the preproduct present as granulate from the funnel 18 and in order then to scatter this preproduct in a uniform layer thickness onto the lower plastic belt 12.

Downstream of the scattering device 18, a first heating device 22 is provided, which, for example by means of infrared radiation, can cause the scattered preproduct to be heated.

There follows, downstream of the feed region 16, a product gap 24 which extends over a product gap region from a front deflecting roller 26 for the upper plastic belt 14 as far as a rear deflecting roller 28 for the upper plastic belt 14. A rear deflecting roller 30 for the lower plastic belt 12 lies exactly opposite the rear deflecting roller 28. The plastic belts 12, 14 are guided exactly parallel to one another by means of suitable guide rollers over the entire region of the product gap 24. For this purpose, merely by way of example, four pressure or guide rollers 32 are illustrated. The pressure rollers 32 and, if appropriate, further rollers prevent the situation where the plastic belts 12, 14 move too far apart from one another when a preproduct is present in the product gap 24. If there is no preproduct in the product gap 24, the upper plastic belt 14, because of its comparatively low tension and its low flexural rigidity, lies on the lower plastic belt 12 over wide portions of the product gap 24.

When the double belt press 10 is in operation, the two plastic belts 12, 14 revolve at exactly the same speed. There is therefore no relative speed between a preproduct at the start of the product gap 24 or a plate-like product at the end of the product gap 24 and the plastic belts 12, 14.

In the initial region of the product gap 24, pressure and heating devices 34 are provided in each case on a rear side of the lower plastic belt 12 and on a rear side of the upper plastic belt 14. By means of these pressure and heating devices 34, a height of the product gap is maintained at the exactly stipulated value, and at the same time the plastic belts 12, 14 and therefore also the preproduct located in the product gap are heated. The double belt press 10 illustrated is intended for the processing of thermoplastic materials, and heating by means of the pressure and heating devices 34 consequently causes the individual particles of the preproduct to be welded together in the product gap 24. A pressure which prevails in the region of the pressure and heating devices 34 in the product gap is in this case comparatively low and is of the order of between 0.2 and 2 bar. At higher pressure forces, either the plastic belts 12, 14 become worn very quickly and/or undesirable surface structures are formed in the finished plate-like product, since the plastic belts 12, 14, because of their low flexural rigidity, are not capable of distributing a locally applied pressure over a large area.

Downstream of the pressure and heating devices 34, a first, lower revolving steel belt 36 and a second, upper revolving steel belt 38 are provided. The two revolving steel belts 36, 38 are arranged such that the upper strand of the lower steel belt 36 bears against a rear side, facing away from the product gap 24, of the lower plastic belt 12. The upper steel belt 38 is arranged such that its lower strand bears against a rear side, opposite the product gap 24, of the upper plastic belt 14. By means of the two revolving steel belts 36, 38, a pressure force can thereby be applied to the plastic belts 12, 14 in a shaping portion or region 40 which forms part of the product gap 24, and consequently can be exerted upon the product located in the product gap 24. The shaping portion or region 40 has an upstream product entry end 40a and a downstream product exit end 40b. The pressure force applied by the steel belts 36 and 38 is in this case equalized over the entire length of the shaping portion 40, since the steel belts 36, 38 have considerably higher flexural rigidity than the plastic belts 12, 14. Furthermore, the upper strand of the lower steel belt 36 and the lower strand of the upper steel belt 38 are pressed against the product gap 24 by means of respective revolving roller chains 42 and 44. A pressure force in the product gap 24 inside the shaping portion 40 typically lies in this case in a range of 10 bar to 20 bar. Such a pressure is sufficient to bring even preproducts which are difficult to process into the shape of a plate and to achieve a sufficiently high density of the plate-like products produced. For example, fibers, in particular natural fibers, can be processed with thermoplastic filling material to form plate-like products. The pressure force in the shaping portion 40 is then sufficient in order, even when the fibers to be processed have comparatively high rigidity, to achieve a planar surface of the plate-like product produced.

In the region of the steel belts 36, 38, heating devices 46 are provided, the heating devices 46 acting upon the lower strand of the lower steel belt 36 and upon the upper strand of the upper steel belt 38. On account of the comparatively high heat storage capacity of the steel belts 36, 38, the heating devices 46 can be arranged in the position illustrated and therefore comparatively far away from the product gap 24, since the steel belts 36, 38 can store sufficient heat. In addition to the heating devices 46, there may also be provision whereby the in each case front deflecting roller 48 or 50 for the steel belts 36, 38 can be heated. For this purpose, fluid ducts 52 may be provided in the inner space of the deflecting rollers 50, 48.

The double belt press 10 according to the invention may in this case also readily be used such that no or almost no pressure force is exerted upon the product gap 24 by means of the steel belts 36, 38, but instead the steel belts 36, 38 are merely held in position in order to limit the product gap and consequently the height of the plate-like product produced. In such a case, the steel belts 36, 38 are used merely in order to introduce heat into the product gap 24.

Further pressure or guide rollers 32 or, for example, also further heating devices may be provided downstream of the shaping portion 40.

In the double belt press 10 illustrated, cooling devices in the form of spray nozzles 54, which spray cooling water against an underside of the upper strand of the lower plastic belt 12, are provided in the end region of the product gap 24. A rear side, facing away from the product gap 24, of the upper plastic belt 14 can be cooled in a simple way, for example, by means of a blower 33. The finished plate-like product can then be extracted at the end of the product gap 24.

The double belt press 10 also has, further, devices for laminating on a coating. For this purpose, a roller 60, on which a layer 62 to be laminated on is rolled, is also provided upstream of the entry into the product gap 24. This layer 62, for example a thin film, is then drawn, together with the preproduct scattered in the feed region 16, into the product gap 24 and, while it runs through the product gap 24, is bonded with the preproduct. It is, of course, also possible in this case to laminate one or more layers both onto an underside and onto a topside of the plate-like product.

Figure 2:
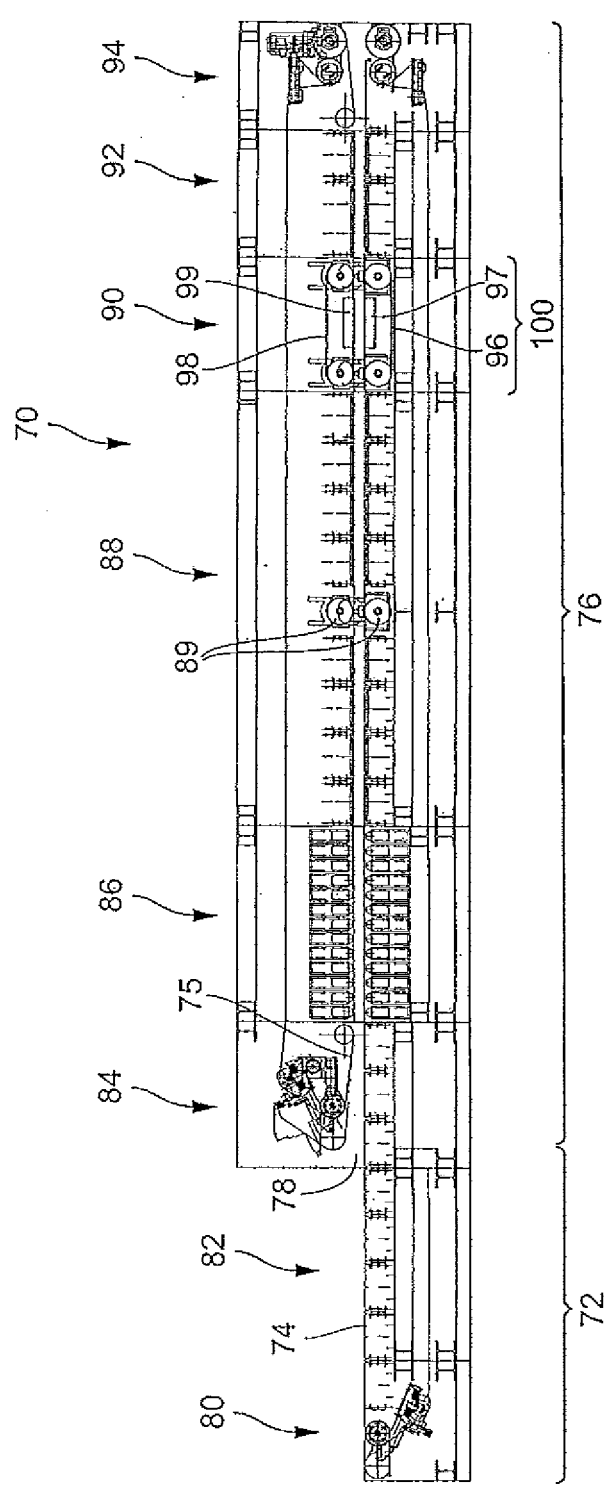
FIG. 2 shows a sectional view of a double belt press according to the invention in a further embodiment.

The illustration in FIG. 2 shows a double belt press 70 according to the invention in a further embodiment of the invention. The basic functioning of the double belt press 70 is the same as described with reference to FIG. 1 and the double belt press 10, and therefore this basic functioning is not explained again. The double belt press 70 has a feed region 72 in which a preproduct is applied to a lower plastic belt 74 by means of devices, not illustrated, for example scattering devices. Downstream of the feed region 72, a product gap region 76 commences, in which a product gap 78 has a constant height with the exception of an entry and an exit region. After running through the product gap 78, the plate-like product produced can be extracted at its end.

A machine frame of the double belt press 70 according to the invention has a modular set-up and is composed overall of eight modules 80 to 94. The modules 80 to 94 have in each case a closed-off self-supporting frame and are connected releasably to the other modules. When a double belt press 70 according to the invention is being set up or else being converted, individual modules can therefore be inserted or removed, and only the length of the plastic belts 74, 75 has to be adapted in this case.

The module 80 has a front deflecting unit for the lower plastic belt 74. Heating devices are provided in the region of the module 82 below the lower plastic belt 74. The module 84 has a front deflection for the upper plastic belt 75 and also heating devices below the lower plastic belt 74. Heating devices, especially heating blowers, are provided in the module 86, in order to heat the lower plastic belt 74 and the upper plastic belt 75 and consequently the preproduct located in the product gap 78 and weld the particles of the latter to one another. Plate-like heating and pressure devices are provided in the module 88 and two pressure rollers 89 are provided centrally in the module 88 in order to set the height of the product in the product gap 78 at a predefined value. In the module 90, a lower revolving steel belt 96 and an upper revolving steel belt 98 are provided, which run parallel to the product gap in the region of a shaping portion 100 and bear against a respective rear side, facing away from the product gap 78, of the plastic belts 74, 75. In the module 90, a pressure force can be exerted by means of the steel belts 96, 98 upon the product located in the product gap 78 and/or heat can be introduced into the product gap 78, the pressure force typically lying in the range of between 10 and 20 bar. In the module 92, once again, plate-like pressure and heating devices are provided, while alternatively, in module 92, cooling may also take place. The in each case rear deflection for the lower plastic belt 74 and that for the upper plastic belt 75 are arranged in the module 94.

It can be seen from the illustration in FIG. 2 that the shaping portion 100 in which the two revolving steel belts are provided is substantially shorter than the length of the product gap 78. The double belt press according to the invention can therefore be implemented cost-effectively, since the steel belts 96, 98 are costly, as compared with the plastic belts 74, 75. Nevertheless, inside the module 90, a comparatively high pressure force can be exerted upon the product located in the product gap 78 or a large quantity of heat can be introduced. On account of the high flexural rigidity of the steel belts 96, 98, a pressure force can be exerted with an equalized profile over the entire length of the shaping portion 100. The length of the shaping portion 100 amounts to at most half the length of the product gap and can even amount to less than one tenth of the length of the product gap 78.

The invention claimed is:

1. A double belt press with a first, lower revolving plastic belt and with a second, upper revolving plastic belt, the first and second plastic belts having a first, low flexural rigidity, a product gap formed between mutually confronting and opposed strands of the first and second plastic belts for the purpose of shaping a plate-like product, a first revolving lower steel belt and a second revolving upper steel belt, the first and second steel belts having a second flexural rigidity which is high in relation to the flexural rigidity of the first and second plastic belts, a shaping portion formed between mutually confronting and opposed strands of the first and second steel belts, the shaping portion forming part of the product gap, wherein during operation the first, lower steel belt runs in the shaping portion parallel to and so as to bear against a rear side, facing away from the product gap, of the first, lower plastic belt, and during operation the second, upper steel belt runs in the shaping portion parallel to and so as to bear against a rear side, facing away from the product gap, of the second, upper plastic belt, the double belt press further including a first heating device disposed adjacent the rear side of the second, upper plastic belt and spaced upstream, with respect to a direction of travel of the opposed strands of the first and second plastic belts, of the shaping portion to heat the second, upper plastic belt and/or a first cooling device disposed adjacent the rear side of the second, upper plastic belt and spaced downstream, with respect to the direction of travel of the opposed strands of the first and second plastic belts, of the shaping portion to cool the second, upper plastic belt, and a second heating device disposed adjacent the rear side of the first, lower plastic belt and spaced upstream, with respect to the direction of travel of the opposed strands of the first and second plastic belts, of the shaping portion to heat the first, lower plastic belt and/or a second cooling device disposed adjacent the rear side of the first, lower plastic belt and spaced downstream, with respect to the direction of travel of the opposed strands of the first and second plastic belts, of the shaping portion to cool the first, lower plastic belt.

2. The double belt press as claimed in claim 1, further including heating and/or cooling devices disposed to heat or cool the first and second steel belts.

3. The double belt press as claimed in claim 1, further including pressure devices disposed to apply a pressure force to the first and second steel belts in the shaping portion and, in turn, to a product located in the shaping portion.

4. The double belt press as claimed in claim 3, wherein the pressure force lies in the range of 0.1 bar to 50 bar ($0.1 \times 10^5$ $N/m^2$ to $50 \times 10^5$ $N/m^2$).

5. The double belt press as claimed in claim 3, wherein the pressure devices are configured to apply a pressure force which is uniform essentially over an entire extent of the shaping portion.

6. The double belt press as claimed in claim 5, wherein the pressure devices act with pressurized fluid upon a rear side, facing away from the product gap, of each of the first and second steel belts.

7. The double belt press as claimed in claim 1, wherein the first and second plastic belts are provided, at least on sides thereof which face the product gap, with a nonstick coating.

8. The double belt press as claimed in claim 1, further including at least in the shaping portion, side boundaries disposed to laterally limit the product gap.

9. The double belt press as claimed in claim 1, further including a machine stand configured for modular set up and including a plurality of modules connected releasably to one another and arranged in the direction of travel of the opposed strands of the first and second plastic belts.

10. The double belt press as claimed in claim 9, wherein the first and second steel belts and deflectors for the first and second steel belts are arranged inside one module of the machine stand.

11. The double belt press as claimed in claim 1, wherein a length of the shaping portion, taken in the direction of travel of the opposed strands of the first and second plastic belts, is less than half a length, taken in the direction of travel of the opposed strands of the first and second plastic belts, of the product gap.

12. The double belt press as claimed in claim 11, wherein the length of the shaping portion is less than one tenth of the length of the product gap.

13. The double belt press as claimed in claim 1, wherein the double belt press includes the first and second heating devices and the first and second cooling devices, and the first and second heating devices are spaced upstream of an upstream entry end of the shaping portion and the first and second cooling devices are spaced downstream from a downstream exit end of the shaping portion.

14. The double belt press as claimed in claim 1, wherein the first and second steel belts each form a closed loop, the double belt press includes the first and second heating devices, and the first and second heating devices are disposed upstream of the first and second steel belts.

15. The double belt press as claimed in claim 14, wherein the first and second plastic belts each form a closed loop, the second, upper steel belt being disposed within the second, upper plastic belt and the first, lower steel belt being disposed within the first, lower plastic belt, the first and second heating devices being disposed upstream from an upstream entry end of the shaping portion.

16. A double belt press comprising:
a first plastic belt;
a second plastic belt, said first and second plastic belts each having a first rigidity, each said first and second plastic belt being supported on said double belt press for revolution about respective paths of travel and disposed adjacent one another such that said first and second plastic belts have respective belt portions disposed in opposed and facing relation with one another and traveling in the same direction as one another, said belt portions being spaced-apart from one another to define a gap therebetween in which a plate-shaped product is formed, said belt portions each having a first side facing towards said gap and a second side facing away from said gap;
a first steel belt;
a second steel belt, said first and second steel belts each having a second rigidity greater than the first rigidity of said first and second plastic belts, each said first and second steel belt being supported on said double belt press for revolution about respective paths of travel and disposed adjacent one another such that said first and second steel belts have respective belt portions disposed in opposed and facing relation with one another and traveling in the same direction as one another, said belt portions of said first and second steel belts being spaced-apart from one another to define a product shaping region therebetween and disposed along part of said gap, said belt portion of said first steel belt being disposed substantially parallel to and bearing against said second side of said first plastic belt in said shaping region and said belt portion of said second steel belt being disposed substantially parallel to and bearing against said second side of said second plastic belt in said shaping region, said shaping region having an entry area in which product enters said shaping region and an exit area at which product exits said shaping region;
a first heating device disposed adjacent said second side of said first plastic belt to heat said first plastic belt, said first heating device being spaced upstream, with respect to the direction of travel of said belt portions of said first and second plastic belts, of said entry area of said shaping region; and
a second heating device disposed adjacent said second side of said second plastic belt to heat said second plastic belt, said second heating device being spaced upstream, with respect to the direction of travel of said belt portions of said first and second plastic belts, of said entry area of said shaping region.

17. The double belt press as claimed in claim 16, wherein said first and second steel belts are endless and each forms a closed loop, said first and second heating devices being disposed upstream of said loops formed by said first and second steel belts.

18. The double belt press as claimed in claim 16, wherein said first and second plastic belts and said first and second steel belts are endless and each forms a closed loop, said second steel belt being disposed within said second plastic belt and said first steel belt being disposed within said first plastic belt, said first heating device being disposed interiorly of said first plastic belt immediately adjacent said second side thereof and exteriorly of said second steel belt, said second heating device being disposed interiorly of said second plastic belt and immediately adjacent said second side thereof and exteriorly of said second steel belt.

19. The double belt press as claimed in claim 16, wherein said first and second steel belts are endless and each forms a closed loop, and said first and second heating devices are disposed exteriorly of said first and second steel belts.

20. The double belt press as claimed in claim 16, further including a first cooling device disposed adjacent said second side of said first plastic belt to cool said first plastic belt, said first cooling device being spaced downstream, with respect to the direction of travel of said belt portions of said first and second plastic belts, of said exit area of said shaping region, and a second cooling device disposed adjacent said second side of said second plastic belt to cool said second plastic belt, said second cooling device being spaced downstream, with respect to the direction of travel of said belt portions of said first and second plastic belts, of said exit area of said shaping region.

21. The double belt press as claimed in claim 16, wherein said first and second heating devices are configured to apply pressure to product traveling within said gap upstream, with respect to the direction of travel of said belt portions of said first and second plastic belts, of said shaping region and said belt portions of said first and second steel belts.

22. The double belt press as claimed in claim 21, wherein said belt portions of said first and second steel belts are first belt portions and said first and second steel belts include respective second belt portions, said second belt portions of said first and second steel belts being spaced remotely from said gap, said double belt press further including third and fourth heating devices, said third heating device being disposed adjacent said second belt portion of said first steel belt to heat said first steel belt and said fourth heating device being disposed adjacent said second belt portion of said second steel belt to heat said second steel belt, said first and second steel belts are endless and each form a closed loop, said third heating device being disposed exteriorly of said first steel belt and said fourth heating device being disposed exteriorly of said second steel belt.

\* \* \* \* \*